United States Patent
Farber (10) Patent No.: US 8,220,681 B2
(45) Date of Patent: *Jul. 17, 2012

(54) ANTI-SWAY BICYCLE MOUNT

(75) Inventor: Robert Farber, Montreal (CA)

(73) Assignee: Swiss Cargo Industries S.A. Inc., St. Jean, Quebec (CA)

( * ) Notice: Subject to any disclaimer, the term of this patent is extended or adjusted under 35 U.S.C. 154(b) by 110 days.

This patent is subject to a terminal disclaimer.

(21) Appl. No.: 12/859,497

(22) Filed: Aug. 19, 2010

(65) Prior Publication Data

US 2011/0180578 A1    Jul. 28, 2011

Related U.S. Application Data (60) Provisional application No. 61/298,484, filed on Jan. 26, 2010.

(51) Int. Cl.
*B60R 9/10* (2006.01)
(52) U.S. Cl. .......... 224/532; 224/537; 224/924
(58) Field of Classification Search ........ 224/532, 224/537, 924; D12/408
See application file for complete search history.

(56) References Cited

U.S. PATENT DOCUMENTS

| | | |
|---|---|---|
| 5,211,323 A | 5/1993 | Chimenti et al. |
| 5,259,542 A | 11/1993 | Newbold et al. |
| 5,505,357 A | 4/1996 | Chimenti et al. |
| 5,573,165 A | 11/1996 | Bloemer et al. |
| 5,775,555 A | 7/1998 | Bloemer et al. |
| 5,826,767 A | 10/1998 | Chimenti et al. |
| 6,000,593 A | 12/1999 | Chimenti |
| 6,286,738 B1 | 9/2001 | Robins et al. |
| 6,336,580 B1 * | 1/2002 | Allen et al. .......... 224/532 |
| 6,345,748 B1 | 2/2002 | Chimenti et al. |
| 6,386,407 B1 | 5/2002 | Erickson et al. |
| 6,422,443 B1 | 7/2002 | Erickson et al. |
| 6,431,423 B1 | 8/2002 | Allen et al. |
| 6,467,664 B2 | 10/2002 | Robins et al. |
| 6,516,986 B1 | 2/2003 | Lassanske et al. |
| 6,772,927 B2 | 8/2004 | Bogoslofski |
| 6,840,418 B2 | 1/2005 | Robins et al. |
| 6,988,645 B1 | 1/2006 | Nusbaum et al. |
| 7,213,731 B1 | 5/2007 | Kolda |
| 7,261,228 B2 | 8/2007 | Prescott et al. |
| 7,401,715 B2 | 7/2008 | Edgerly |
| 7,404,504 B2 | 7/2008 | Settelmayer |
| 7,757,917 B2 * | 7/2010 | Bogoslofski et al. ......... 224/537 |
| 2001/0025866 A1 | 10/2001 | Morris et al. |
| 2005/0035168 A1 | 2/2005 | Prescott et al. |
| 2005/0133555 A1 | 6/2005 | Bove et al. |

(Continued)

FOREIGN PATENT DOCUMENTS

WO    WO 2006/020937 A2    2/2006

*Primary Examiner* — Justin Larson
(74) *Attorney, Agent, or Firm* — Husch Blackwell LLP (57) ABSTRACT

An anti-sway bicycle mount is provided. The bicycle mount includes a trough section, a collar section disposed adjacent to the trough section, a neck section disposed adjacent to the collar section, opposite the trough section, and a channel section disposed adjacent to the neck section, opposite the collar section. The trough section is adapted to receive a crossbar of a bicycle, the collar section is adapted to receive a support arm of a bicycle carrier, and the channel section is adapted to receive a tube member of the bicycle. The neck section facilitates forward and back motion of the channel section while restricting side to side movement of the channel section.

25 Claims, 12 Drawing Sheets

U.S. PATENT DOCUMENTS

| | | |
|---|---|---|
| 2005/0199669 A1 | 9/2005 | Robins et al. |
| 2006/0032879 A1 | 2/2006 | Settelmayer et al. |
| 2007/0235487 A1 | 10/2007 | Bogoskofski et al. |
| 2008/0093404 A1 | 4/2008 | Clausen et al. |
| 2008/0190979 A1 | 8/2008 | Robins et al. |
| 2009/0120985 A1 | 5/2009 | Sautter et al. |
| 2009/0120986 A1 | 5/2009 | Sautter et al. |

* cited by examiner

ANTI-SWAY BICYCLE MOUNT

CROSS-REFERENCE TO RELATED APPLICATIONS

This application claims priority to and incorporates by reference U.S. Provisional Patent Application No. 61/298,484 filed Jan. 26, 2010 and titled "Anti-Sway Bicycle Mount."

FIELD OF INVENTION

The present invention generally relates to bicycle mounts. More particularly, the present invention relates to bicycle mounts for restricting the swaying motion of bicycles mounted thereto.

BACKGROUND

Bicycles typically include a front tube between the bicycle's handle bars and the fork of the bicycle, and a rear tube that extends below the seat of the bicycle. A crossbar and a transverse tube can extend from the front tube to the rear tube, and the bicycle can be supported at its crossbar and/or transverse tube when attached to a bicycle carrier for transporting the bicycle. The transverse tube can be disposed below the crossbar.

Bicycle carriers for transporting bicycles on the back of a motor vehicle are known in the art. Some bicycle carriers can be mounted to the trunk of a vehicle, and some bicycle carriers can be mounted to the hitch of a vehicle. Typical bicycle carriers include at least one or two support arms that extend from the frame of the bicycle carrier in a rearward direction away from the back of the vehicle.

Saddles or mounts can be placed on the support arms of a bicycle carrier to receive the crossbar of a bicycle. Straps or bindings can be used to secure to bicycle to the mount. Such mounts can prevent direct contact between the bicycle and the support arm, which may cause damage to one or both of the support arm and the crossbar.

Mounts and their associated straps can prevent excessive movement of a bicycle during vehicular travel. However, mounts and straps known in the art have not been able to satisfactorily prevent the back and forth swaying movement of a bicycle toward and away from the vehicle when the vehicle accelerates and decelerates. Such a swaying motion, if not restricted, can result in the bicycle swaying against other bicycles mounted on the support arms or against the rear of the vehicle itself.

In view of the above, a bicycle mount that restricts the swaying motion of a bicycle mounted thereto is desired. Preferably, such a bicycle mount is simple to manufacture or to mold so that tooling and material costs are minimized and the mount is easy to install and use.

SUMMARY OF THE INVENTION

According to one embodiment of the present invention, an anti-sway bicycle mount is provided. The bicycle mount can include a trough section, a collar section disposed adjacent to the trough section, a neck section disposed adjacent to the collar section, opposite the trough section, and a channel section disposed adjacent to the neck section, opposite the collar section. The trough section can be adapted to receive a crossbar of a bicycle, the collar section can be adapted to receive a support arm of a bicycle carrier, and the channel section can be adapted to receive a tube member of the bicycle. The neck section can facilitate forward and back motion of the channel section while restricting side to side movement of the channel section.

The trough section can extend in a lateral direction and can include open first and second ends and raised first and second sides. The raised first and second sides can restrict movement of the crossbar. Ribbing can be disposed within the trough section.

The anti-sway bicycle mount can also include at least one strap and a plurality of connection points disposed on an exterior surface of the trough section. The first end of the strap can attach to a first connection point, and the second end of the strap can attach to a second connection point. The strap can secure the crossbar in the trough section.

The collar section can include a central opening through which the support arm traverses, and the opening can be one of circular, ovular, square, or rectangular. Ribbing can be disposed around at least a portion of an interior circumference of the opening, and ribbing can be disposed on at least a portion of an exterior of the collar section.

The neck section can extend generally perpendicular to the trough section, and the neck section can be flexible in a first direction and rigid in a second direction.

The channel section can contiguously extend from the neck section, and the channel section can include a closed end, an open end, and raised first and second sides. The first and second raised sides can restrict movement of the tube member. An angled transition can be disposed proximate to the closed end of the channel section, and ribbing can be disposed on at least a back side of the channel section.

The anti-sway bicycle mount can also include at least one strap and first and second connection points disposed on an exterior surface of the channel section. The first end of the strap can attach to a first connection point, and the second end of the strap can attach to a second connection point. The strap can secure the tube member in the channel section.

The anti-sway bicycle mount can be formed from one integral piece of material, and the material can include thermoplastic rubber. A second material can be disposed over at least portions of the trough section and the channel section, and the second material can include a polyurethane foam.

According to another embodiment of the present invention a bicycle mount including a trough, a first strap, a collared opening, an elongated member, a channel, and a second strap is provided. The trough can receive a crossbar of a bicycle, and the trough can include raised first and second sides for restricting side to side movement of the crossbar. The first end of the first strap can be attached to the first side of the trough, and the second end of the first strap can be attached to the second side of the trough. The first strap can secure the crossbar in the trough.

The collared opening can be disposed adjacent to the trough and can receive a support arm of a bicycle carrier. The elongated member can be disposed adjacent to the collared opening, opposite the trough. The channel can be disposed adjacent to the elongated member, opposite the collared opening, and can receive a tube member of the bicycle. The channel can include raised first and second sides for restricting side to side movement of the tube member. The first end of the second strap can be attached to the first side of the channel, and the second end of the second strap can be attached to the second side of the channel. The second strap can secure the tube member in the channel. The elongated member can facilitate forward and back motion of the channel to accommodate receiving the tube member of the bicycle while restricting side to side movement of the channel.

Each of the first and second straps can include a plurality of openings disposed along the lengths thereof.

The channel can receive a rear tube of the bicycle while the trough receives the crossbar. The channel can also receive a transverse tube of the bicycle while the trough receives the crossbar.

According to another embodiment of the present invention, a bicycle carrier is provided. The bicycle carrier can include a frame for mounting to a vehicle, first and second support arms extending in a horizontal direction away from the frame, and a plurality of bicycle mounts disposed on each of the first and second support arms.

Each of the bicycle mounts can include a trough, a first strap, a collared opening, an elongated member, a channel, and a second strap. The trough can receive a crossbar of a bicycle, and the trough can include raised first and second sides for restricting side to side movement of the crossbar. The first end of the first strap can be attached to the first side of the trough, and the second end of the first strap can be attached to the second side of the trough. The first strap can secure the crossbar in the trough.

The collared opening can be disposed adjacent to the trough section and can receive a support arm of a bicycle carrier. The elongated member can be disposed adjacent to the collared opening, opposite the trough. The channel can be disposed adjacent to the elongated member, opposite the collared opening, and can receive a tube member of the bicycle. The channel can include raised first and second sides for restricting side to side movement of the tube member. The first end of the second strap can be attached to the first side of the channel, and the second end of the second strap can be attached to the second side of the channel. The second strap can secure the tube member in the channel. The elongated member can facilitate forward and back motion of the channel to accommodate receiving the tube member of the bicycle while restricting side to side movement of the channel.

DESCRIPTION OF THE PREFERRED EMBODIMENTS

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments of the present invention include a bicycle mount that restricts the swaying motion of a bicycle mounted thereto. Preferably, such a bicycle mount is simple to manufacture or to mold so that tooling and material costs are minimized and the mount is easy to install and use.

Figure 1:
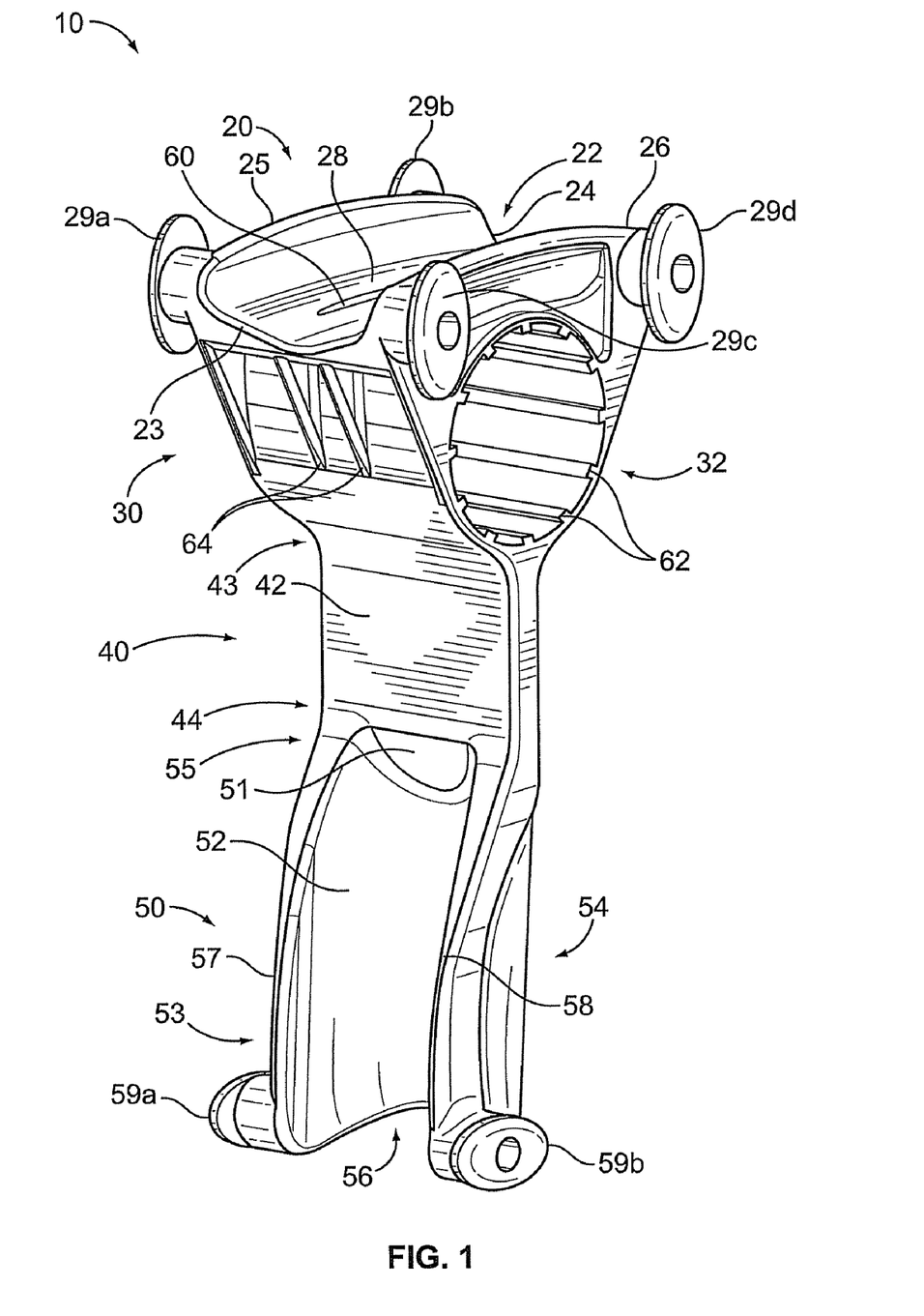
FIG. 1 is a front perspective view of a bicycle mount in accordance with a first embodiment of the present invention.
Figure 8:
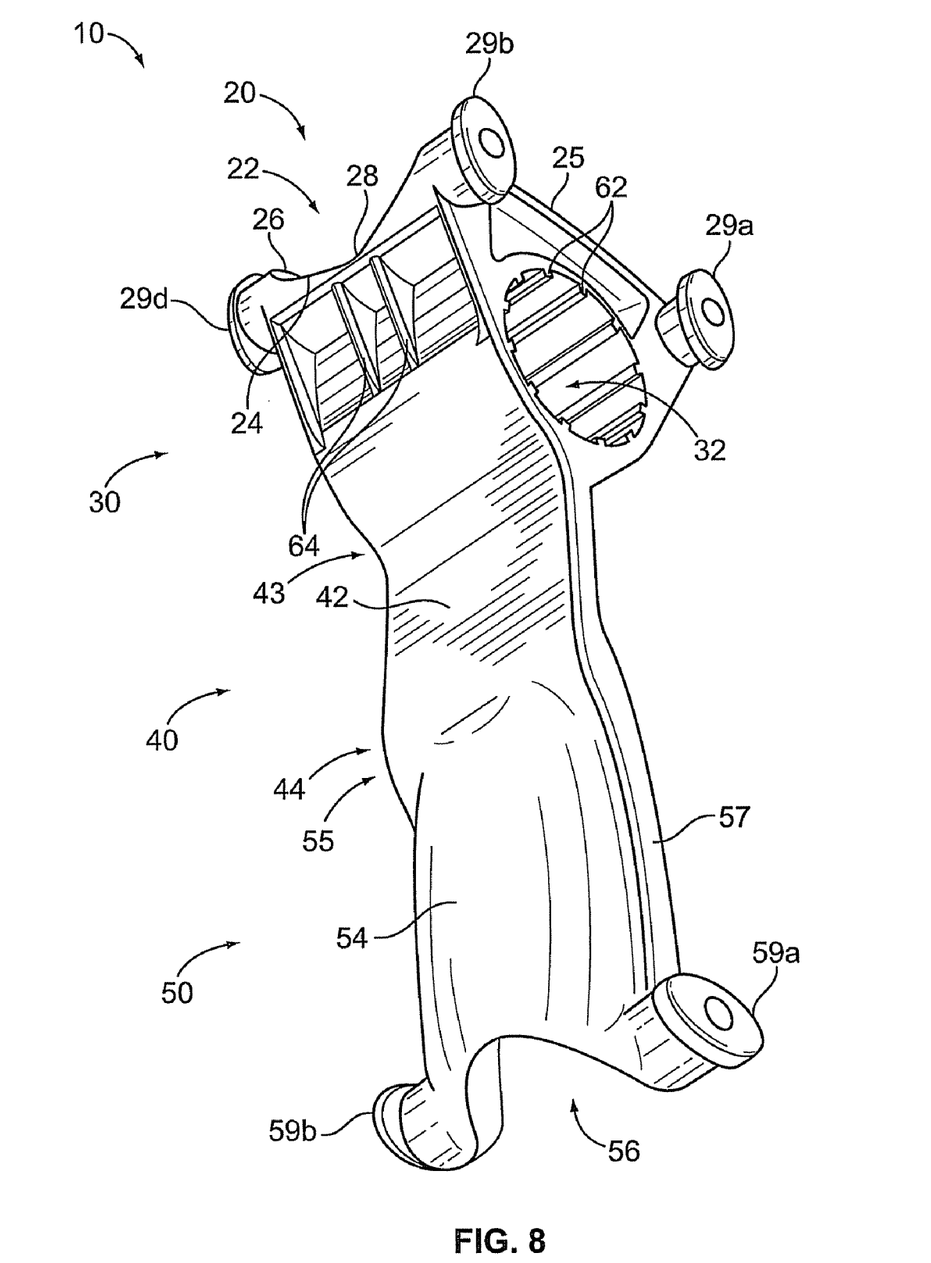
FIG. 8 is a back perspective view of a bicycle mount in accordance with the first embodiment of the present invention.
Figure 9:
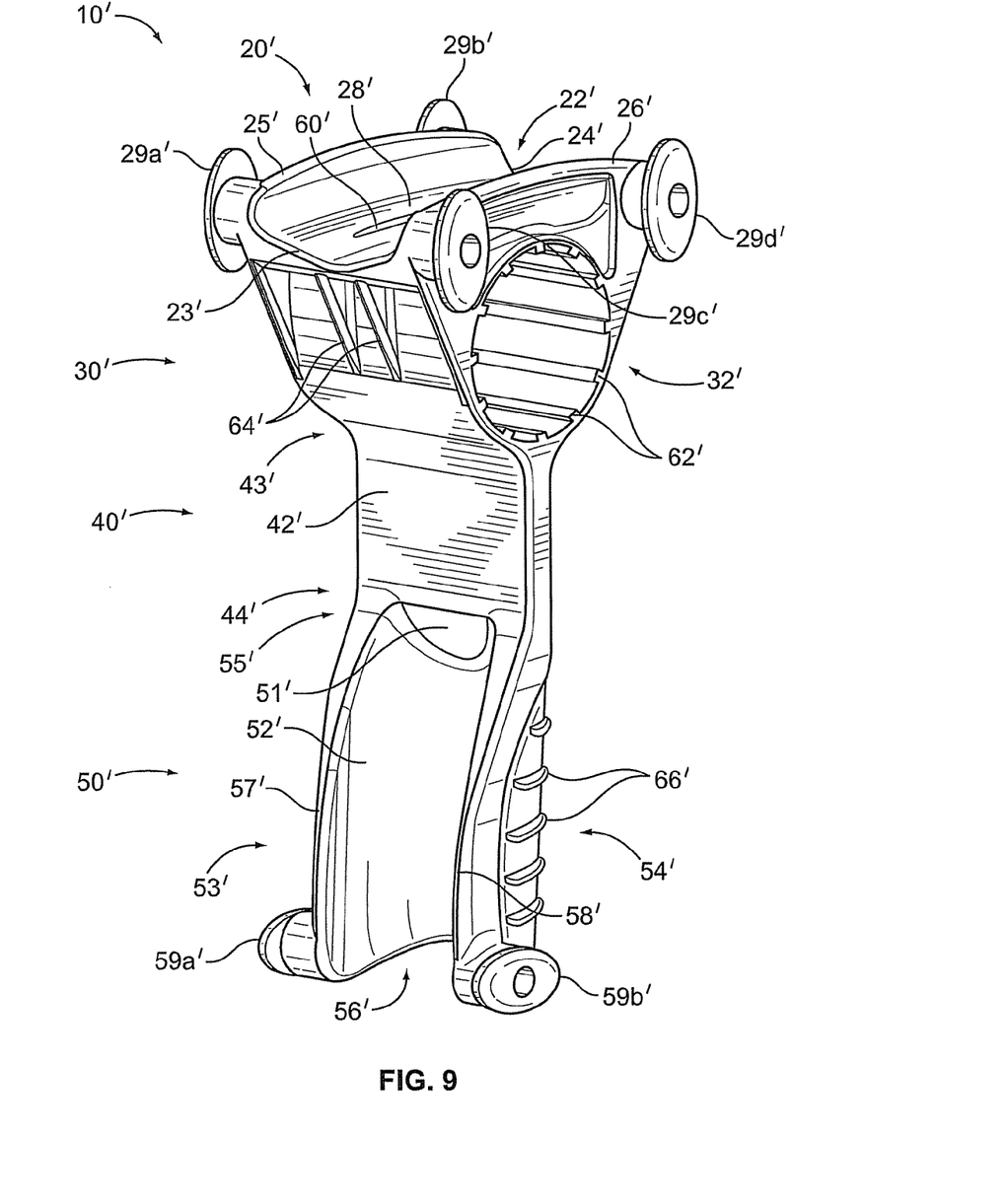
FIG. 9 is a front perspective view of a bicycle mount in accordance with a second embodiment of the present invention.
Figure 10:
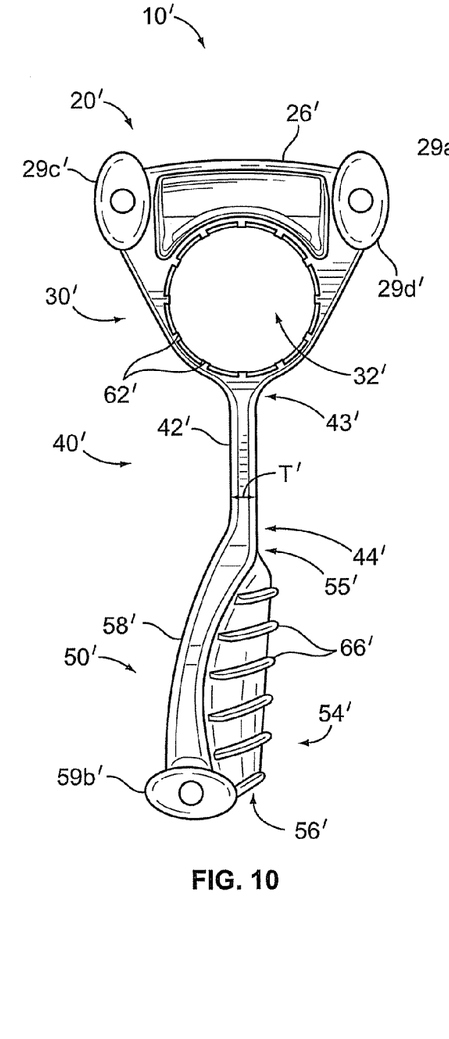
FIG. 10 is a right side view of a bicycle mount in accordance with the second embodiment of the present invention.
Figure 11:
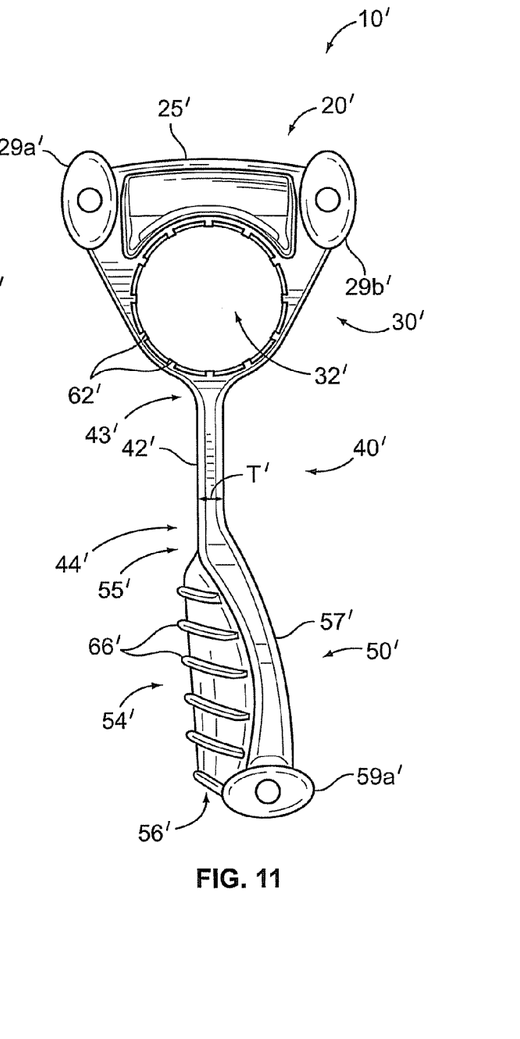
FIG. 11 is a left side view of a bicycle mount in accordance with the second embodiment of the present invention.
Figure 12:
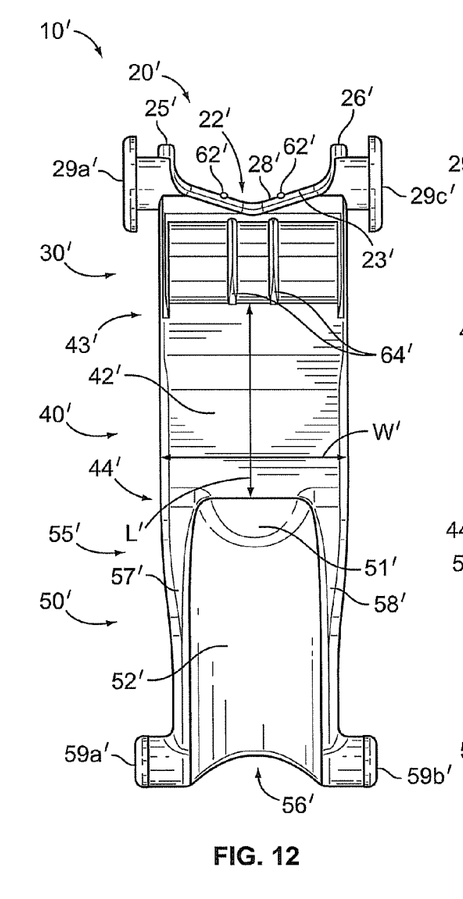
FIG. 12 is a front view of a bicycle mount in accordance with the second embodiment of the present invention.

FIGS. 1-8 are front perspective, right side, left side, front, back, top, bottom, and back perspective views, respectively of a bicycle mount 10 in accordance with a first embodiment of the present invention. As best seen in FIGS. 1 and 8, the bicycle mount 10 can include at least four sections: a trough section 20, a collar section 30, a neck section 40, and a channel section 50. The trough section 20 can be disposed on a top end of the mount 10, and the collar section 30 can be disposed below the trough section 20. The neck section 40 can be disposed below the collar section 30, and the channel section 50 can be disposed below the neck section 40, at a bottom end of the mount 10.

The trough section 10 can include a trough 22 with open first and second ends 23, 24 and raised first and second sides 25, 26. The trough 22 can be elongated in a horizontal direction, and a middle portion 28 of the trough 22 can be depressed and shaped to fit a crossbar of a bicycle placed therein. The raised first and second sides 25, 26 can retain the crossbar in the trough 22 and limit movement of the crossbar towards and away from an associated vehicle.

Figure 6:
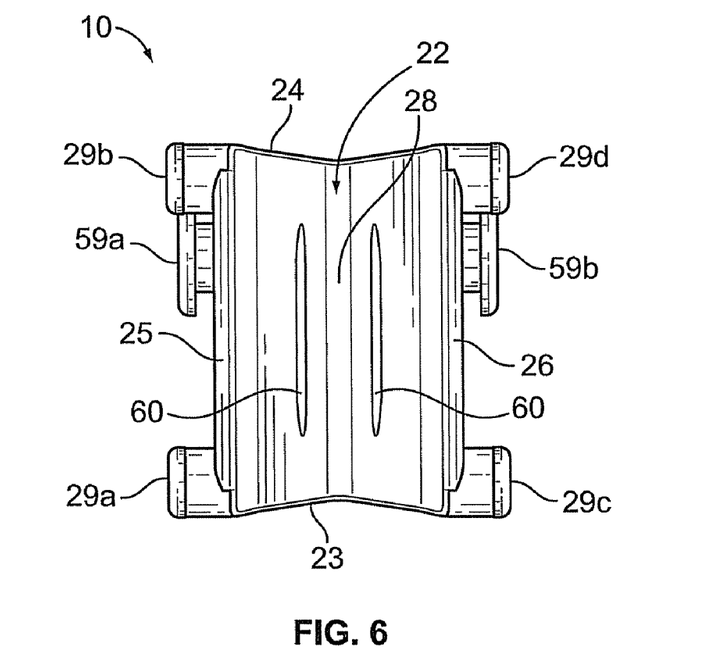
FIG. 6 is a top view of a bicycle mount in accordance with the first embodiment of the present invention.
Figure 7:
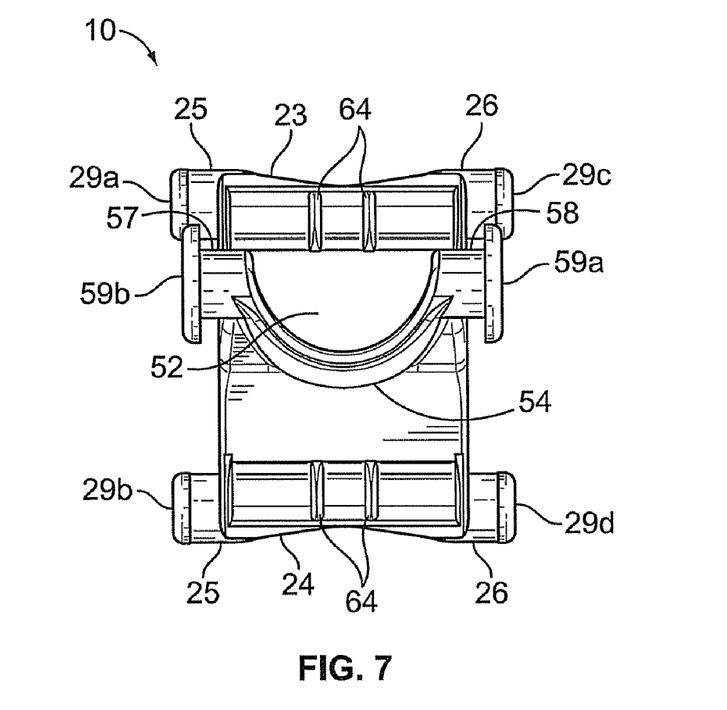
FIG. 7 is a bottom view of a bicycle mount in accordance with the first embodiment of the present invention.

In embodiments of the present invention, the trough 22 can be ribbed for added support and strength and for preventing a crossbar disposed therein from sliding. For example, as best seen in FIG. 6, ribs 60 can be disposed within the trough 22.

Connection points 29a, 29b, 29c, 29d can be disposed at first and second ends of each of the raised first and second sides 25, 26. When the mount 10 is associated with a bicycle, straps can be attached to the connection points 29a, 29b, 29c, 29d to secure the bicycle in place relative to the mount 10. In embodiments of the present invention, each of the connection points 29a, 29b, 29c, 29d can include a post that extends outwardly from the side 25 or 26 on which it is disposed.

The collar section 30 disposed below the trough section 20 can define an opening 32 through which a support arm of a bicycle carrier can traverse. In embodiments of the present invention, the opening 32 can be circular, ovular, square, rectangular, or any other shape as would be known in the art. The opening 32 can be shaped according to a bicycle carrier with which the bicycle mount 10 will be used. For example, if support arms of the bicycle carrier are circular, then the opening 32 can be circular for placing a support arm therethrough.

Figure 2:
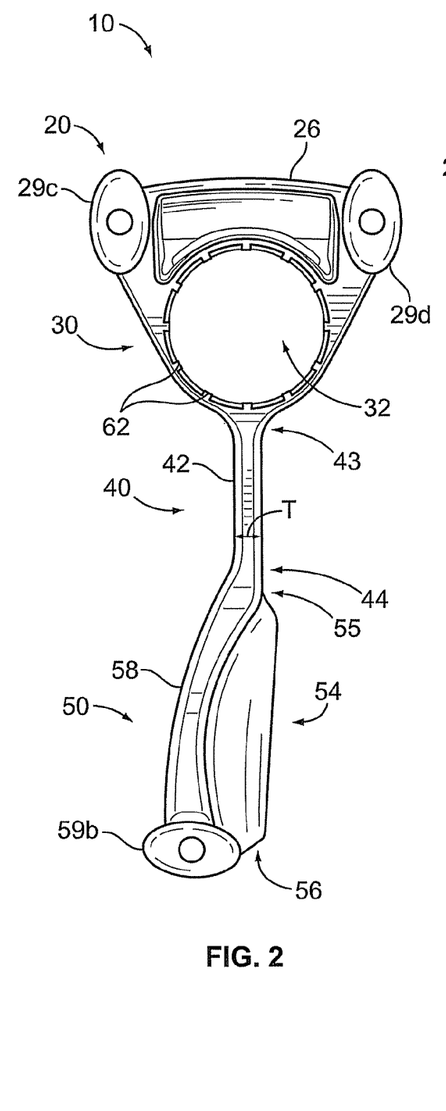
FIG. 2 is a right side view of a bicycle mount in accordance with the first embodiment of the present invention.
Figure 3:
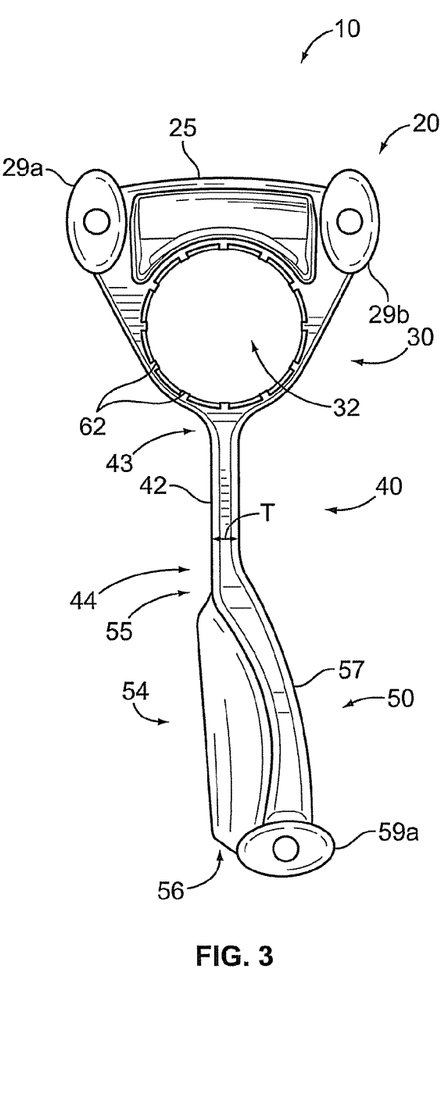
FIG. 3 is a left side view of a bicycle mount in accordance with the first embodiment of the present invention.

In some embodiments of the present invention, the interior of the opening 32 can be ribbed for added support and strength and for preventing a support arm from sliding therein. For example, as best seen in FIGS. 2 and 3, elongated ribs 62 can be disposed around the interior circumference of the opening 32.

Figure 4:
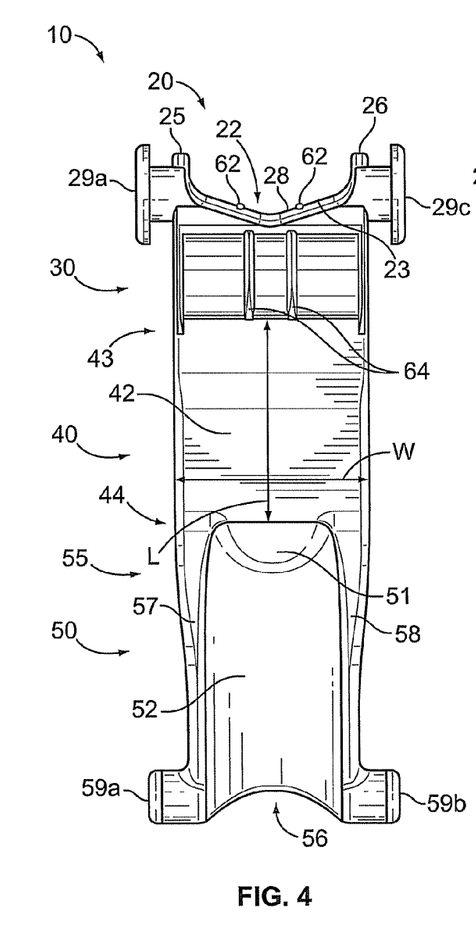
FIG. 4 is a front view of a bicycle mount in accordance with the first embodiment of the present invention.
Figure 5:
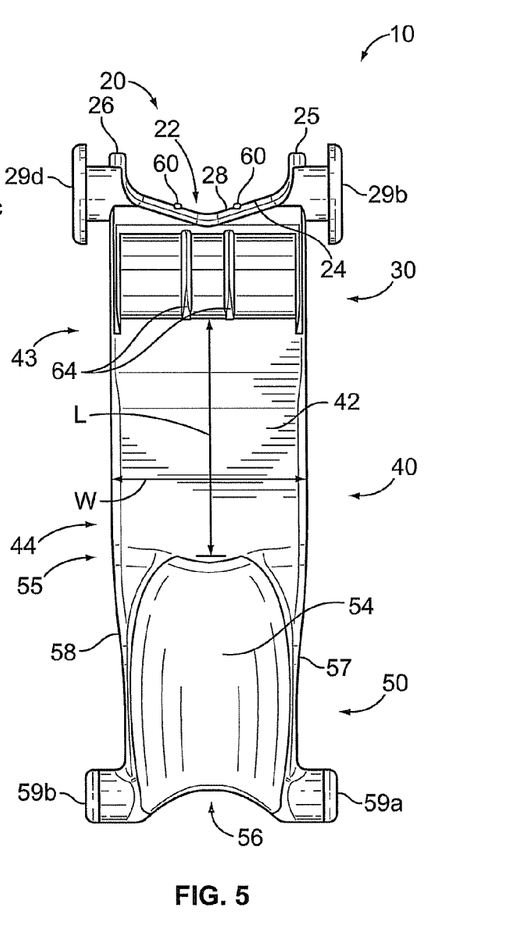
FIG. 5 is a back view of a bicycle mount in accordance with the first embodiment of the present invention.

At least a portion of the exterior of the collar section 30 can also be ribbed for added support and strength. In some embodiments, the exterior ribbing can extend from each of the open ends 23, 24 of the trough section 20 to a middle portion of the collar section 30. For example, as best seen in FIGS. 4 and 5, ribs 64 are disposed on an exterior portion of the collar section 30.

The neck section 40 disposed below the collar section 30 can include an elongated member 42 extending in a vertical direction perpendicular to the trough 22. A top end 43 of the member 42 can be disposed adjacent to the bottom of the collar section 30, and a bottom end 44 of the member 42 can be disposed adjacent to a top end of the channel section 50. In embodiments of the present invention, the elongated member 42 can be flexible.

The channel section 50 disposed below the neck section 40 can include an elongated channel 52 extending in a vertical direction perpendicular to the trough 22. A front side 53 of the channel 52 can be depressed to receive a rear tube or a transverse tube of a bicycle, and, accordingly, a back side 54 of the channel can be arched to accommodate the channel 52.

A top end 55 of the channel 52 can be closed and adjacent to a bottom end 44 of the elongated member 42 in the neck section 40. In embodiments of the present invention, an angled transition 51 can be disposed at or near the top end 55 of the channel 52 to create a smooth surface from the depressed channel 52 to the bottom end 44 of the elongated member 42.

A bottom end 56 of the channel 52 can be open and can receive either the rear tube or transverse tube of an associated bicycle. Raised first and second sides 57, 58 of the channel 52 can retain the rear tube or transverse tube in the channel 52 and limit movement of the rear tube or transverse tube towards and away from an associated vehicle.

Connection points 59a, 59b can be disposed at bottom ends of each of the raised first and second sides 57, 58. When the mount 10 is associated with a bicycle, a strap can be attached to the connection points 59a, 59b to secure the bicycle in place relative to the mount 10. In embodiments of the present invention, each of the connection points 59a, 59b can include a post that extends outwardly from the side 57 or 58 on which it is disposed.

In embodiments of the present invention, the bicycle mount 10 can be one integral piece of material. Accordingly, costs for manufacturing and tooling the mount 10 can be reduced as compared to bicycle mounts made from multiple separate pieces. Furthermore, the integral one-piece bicycle mount 10 according to the present invention can be easier to use and have increased robustness and durability as compared to bicycle mounts made from multiple separate pieces.

The bicycle mount 10 in accordance with the present invention can be made of a material that is durable, resilient, and provides a soft surface to prevent marring and/or scratching of a bicycle associated therewith. In some embodiments, at least a portion of the mount 10 or the entire mount 10 can be made from thermoplastic rubber with a durometer of approximately 100 on the Shore A scale. The mount 10 can be manufactured by molding, for example, injection molding.

In some embodiments, portions of the bicycle mount 10 can be made from a soft material. For example, surfaces that engage with a bicycle, such as the trough 22 and the channel 52 can be made from a material that is softer than thermoplastic rubber. In some embodiments, the bicycle mount made of a first material can be over-molded with a second material on surfaces that engage with a bicycle. For example, a soft polyurethane foam can be over-molded on a thermoplastic rubber in the trough 22 and in the channel 22.

As explained above, in embodiments of the present invention, the elongated member 42 of the neck section 40 can be flexible. The member 42 can be flexible so as to allow the channel section 50 to move in a forward and back direction relative to the trough section 20 and the collar section 30, while restricting side to side movement of the channel section 50 relative to the trough and collar sections 20, 30. The movement of the channel section 50 in a forward and back direction facilitates the same mount 10 accommodating either a rear tube or a transverse tube of a bicycle.

As best seen in FIGS. 2 and 3, the elongated member 42 of the neck section 40 can have a thickness T to facilitate movement in a forward and back direction. As best seen in FIGS. 4 and 5, the elongated member 42 can have a width W to restrict side to side movement.

In some embodiments, at least a portion of the elongated member 42 can be made from a thermoplastic rubber having elasticity and flexibility. In some embodiments, the length L of the member 42 can be approximately 1.5 inches, the width W of the member 42 can be approximately 2 inches, and the thickness T of the member 42 can be approximately 0.25 inches.

FIGS. 9-16 are front perspective, right side, left side, front, back, top, bottom, and back perspective views, respectively of a bicycle mount 10' in accordance with a second embodiment of the present invention. The bicycle mount 10' shown in FIGS. 9-16 is similar to the bicycle mount 10 shown in FIGS. 1-18 except that the mount 10' includes ribbing on the channel section 50'.

Figure 13:
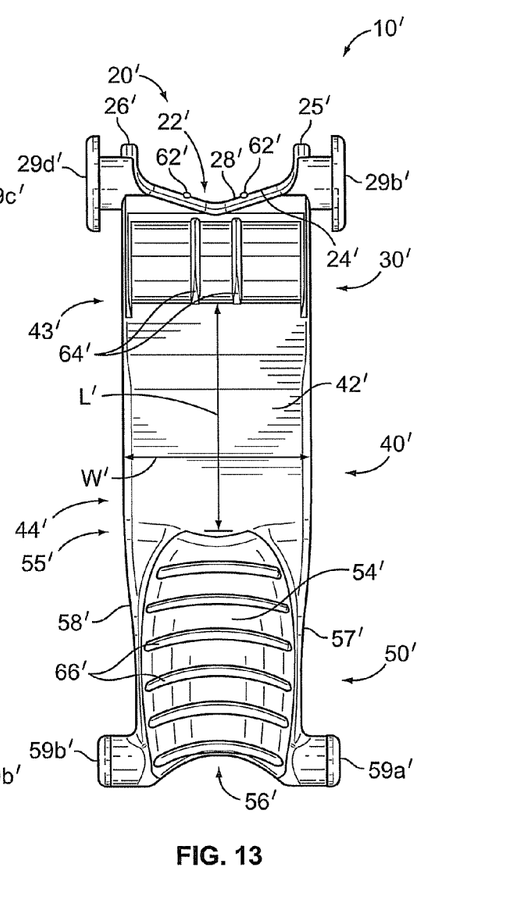
FIG. 13 is a back view of a bicycle mount in accordance with the second embodiment of the present invention.
Figure 14:
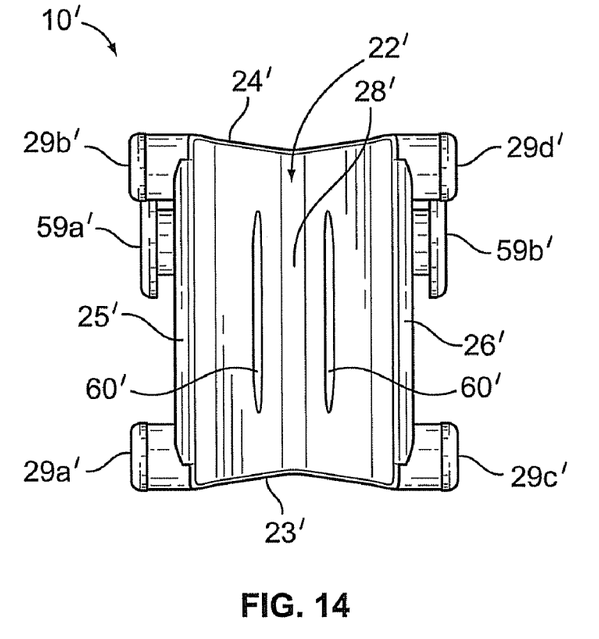
FIG. 14 is a top view of a bicycle mount in accordance with the second embodiment of the present invention.
Figure 15:
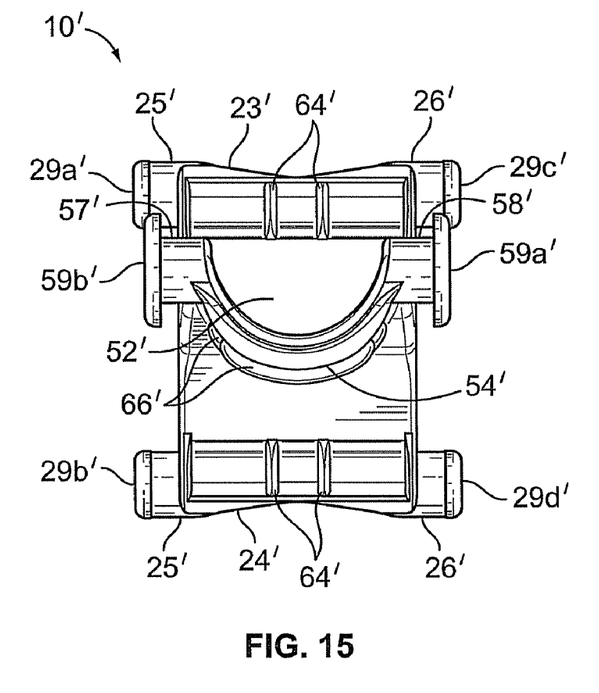
FIG. 15 is a bottom view of a bicycle mount in accordance with the second embodiment of the present invention.
Figure 16:
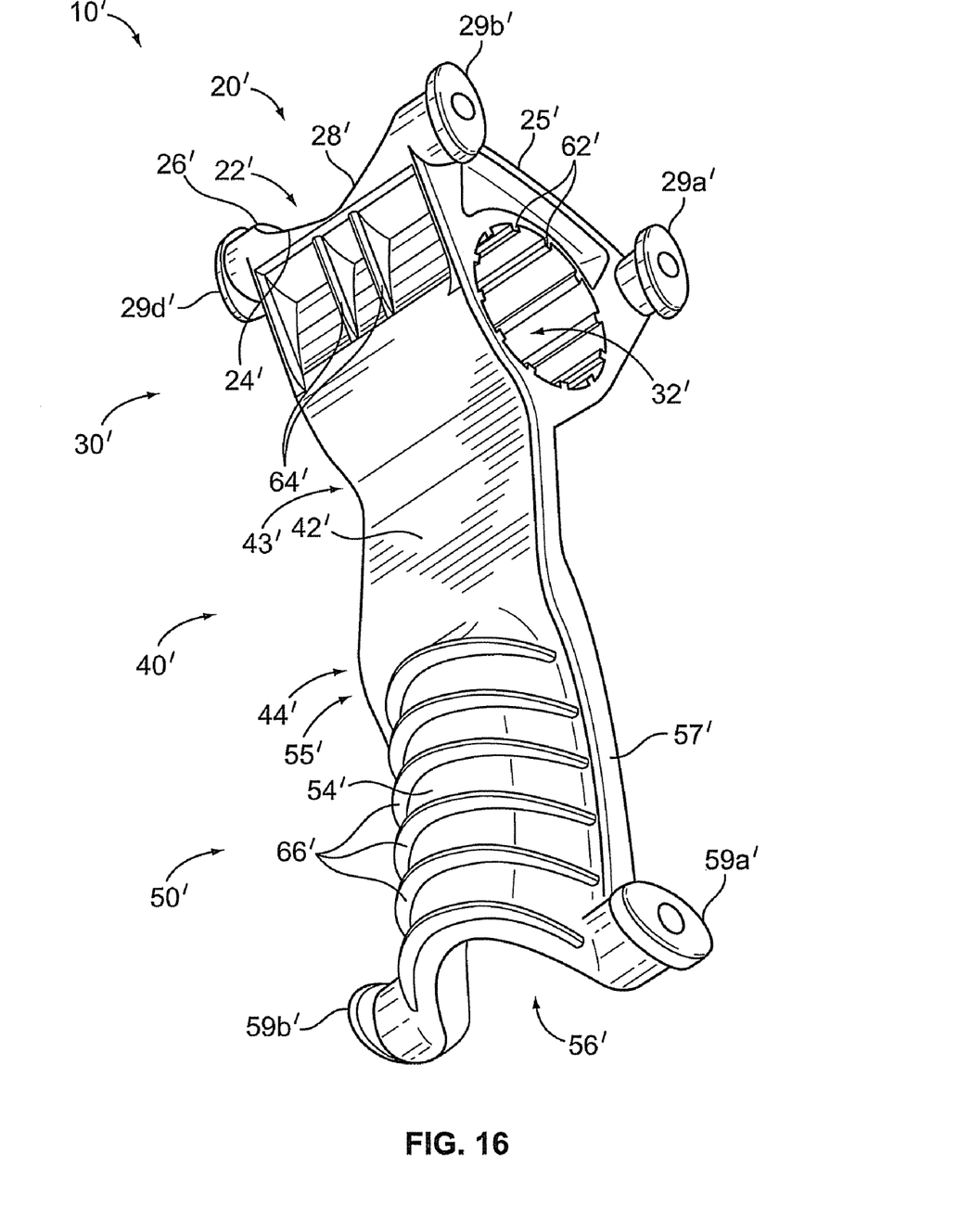
FIG. 16 is a back perspective view of a bicycle mount in accordance with the second embodiment of the present invention.

For example, ribs 66' can be disposed on the back side 54' of the channel 52'. As best seen in FIG. 13, the ribs 66' can extend circumferentially around the arched back side 54'. The ribs 66' can provide added support and strength to the channel 52'.

Figure 17:
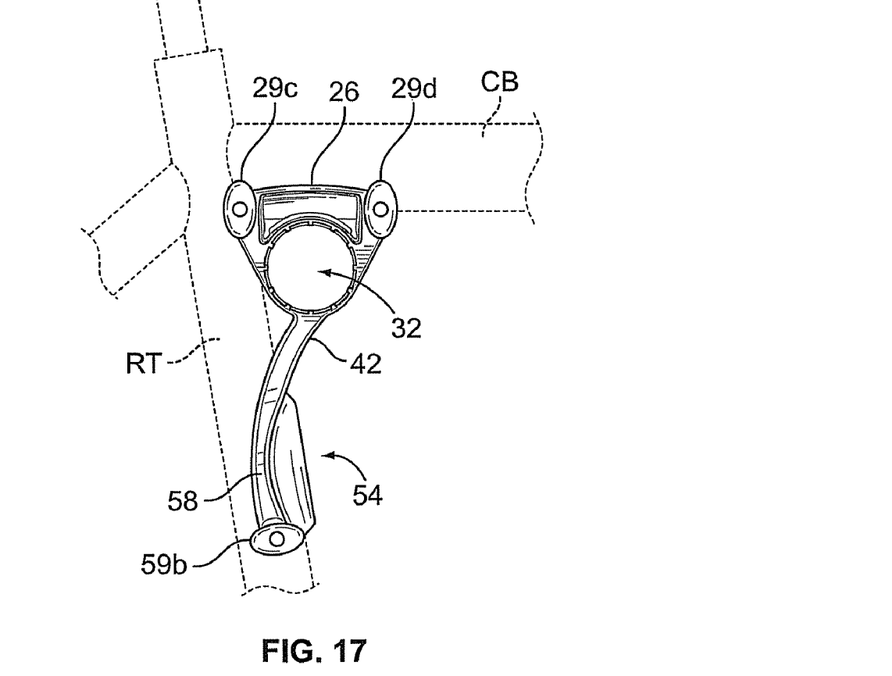
FIG. 17 is a side view of a bicycle mount attached to a crossbar and a rear tube of a bicycle in accordance with the present invention.
Figure 18:
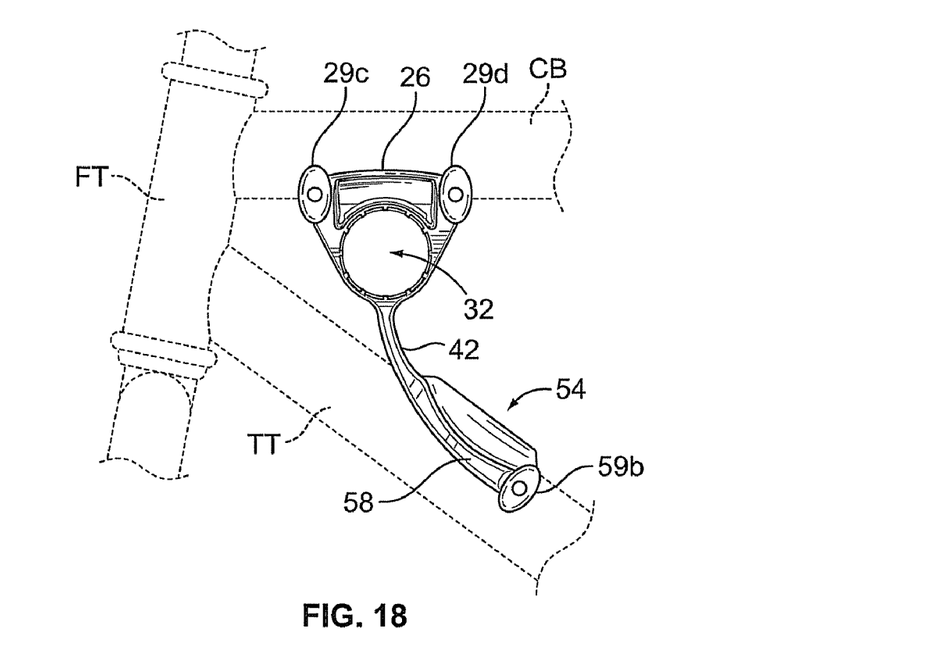
FIG. 18 is a side view of a bicycle mount attached to a crossbar and a transverse tube of a bicycle in accordance with the present invention.

Referring now to FIGS. 17 and 18, a bicycle mount 10 is shown attached to a bicycle. FIG. 17 shows the mount 10 attached to a crossbar CB and rear tube RT of the bicycle, and FIG. 18 shows the mount 10 attached to a crossbar CB and transverse tube TT of the bicycle.

As explained above, the elongated member 42 of the neck section 40 is flexible in a forward and back direction. Therefore, the same bicycle mount 10 can be used to attach to either the rear tube or the transverse tube of the bicycle. As seen in FIG. 17, when the mount 10 attaches to the rear tube RT, the member 42 is not displaced. However, as seen in FIG. 18, when the mount 10 attaches to the transverse tube TT, the mount 10 if flexed and displaced into a position to accommodate the crossbar CB and the transverse tube TT. That is, the member 42 is displaced in a backward direction by the transverse tube TT.

Figure 19:
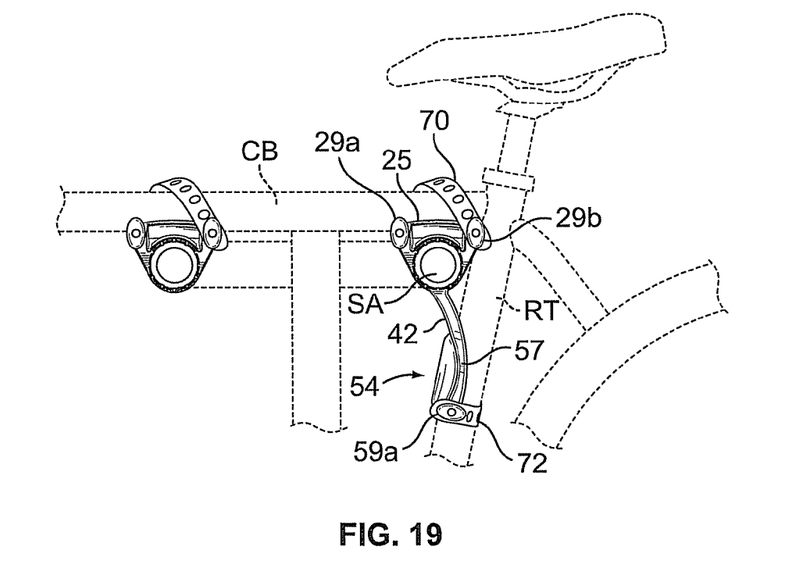
FIG. 19 is a side view of a bicycle mount and associated straps attached to a crossbar and a rear tube of a bicycle in accordance with the present invention.

FIG. 19 is a side view of a bicycle mount 10 and associated straps 70, 72 attached to a crossbar CB and a rear tube RT of a bicycle in accordance with the present invention. A bicycle carrier is attached to the mount 10 via a support arm SA of the bicycle carrier that transverses the opening 32 of the collar section 30 of the mount 10. The bicycle is attached to the mount 10 via the crossbar CB placed in the trough 22 of the trough section 20 of the mount 10 and the rear tube RT placed in the channel 52 of the channel section 50 of the mount 10.

At least one strap 70 can be attached to connection points 29a, 29b, 29c, 29d to secure the crossbar CB in the trough 22. For example, first and second ends of a strap 70 can attach to connection points 29a and 29c, respectively, or to connection points 29b and 29d, respectively. In some embodiments, two straps can secure the crossbar CB in place relative to the trough section 20. For example, a first strap can attach to connection points 29a and 29c, and a second strap can attach to connection points 29b and 29d.

A strap 72 can also be attached to connection points 59a, 59b to secure either the rear tube RT or the transverse tube TT in the channel 52. For example first and second ends of a strap 72 can attach to connection points 59a and 59b, respectively.

Each of the straps 70, 72 can include a plurality of holes along the length of the strap. Any of the holes can attach to the connection points 29a, 29b, 29c, 29d or 59a, 59b by receiving the connection point therethrough. Depending on the size of the crossbar CB, rear tube RT, or transverse tube TT, the holes can be used to adjust the strap 70, 72 to fit tightly around the respective crossbar, rear tube, or transverse tube.

Figure 20:
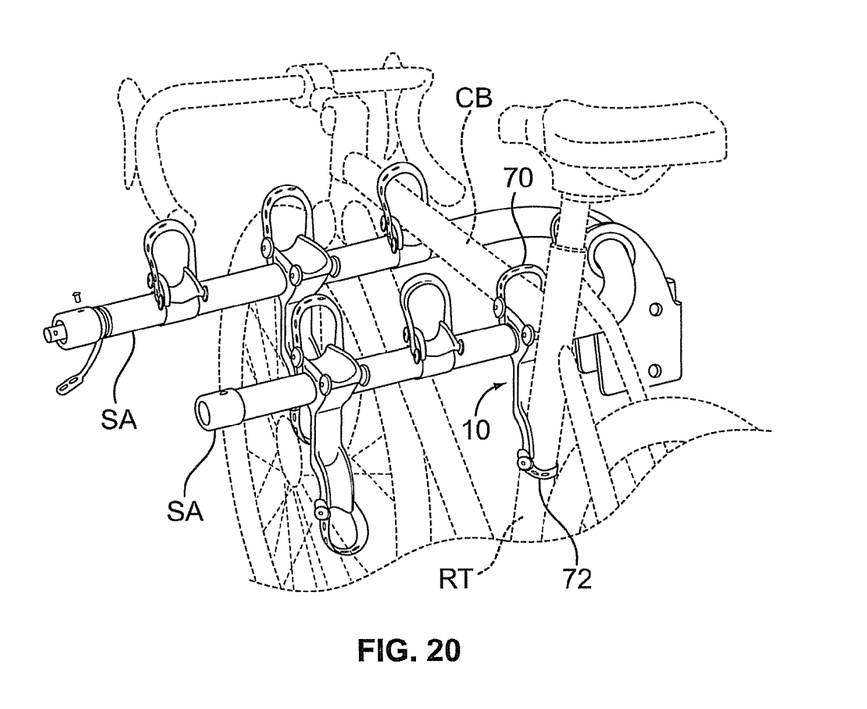
FIG. 20 is a perspective view of a bicycle mount on support arms and attached to a bicycle with associated straps in accordance with the present invention.

As seen in FIG. 20, a plurality of bicycle mounts 10 can be connected to support arms SA of a bicycle carrier. Accordingly, the crossbar CB and the rear tube RT of a bicycle can be attached to one mount, and the crossbar CB and the transverse TT of the same bicycle can be attached to a second mount to carry the bicycle on the bicycle carrier.

A plurality of bicycles can be secured and attached to the bicycle carrier in this manner. As explained above, a bicycle mount 10 in accordance with the present invention restricts side to side movement of the mount 10 and thus, restricts side to side movement of a bicycle attached to the mount 10. Therefore, when a plurality of bicycles are attached to the carrier side by side, the mounts 10 prevent the bicycles from swaying into one another.

From the foregoing, it will be observed that numerous variations and modifications may be effected without departing from the spirit and scope of the present invention. It is to be understood that no limitation with respect to the specific system or method illustrated herein is intended or should be inferred. It is, of course, intended to cover by the appended claims all such modifications as fall within the spirit and scope of the claims.

What is claimed is:

1. A bicycle carrier comprising:
a frame for mounting to a vehicle;
first and second support arms extending in a horizontal direction away from the frame; and
a plurality of bicycle mounts disposed on each of the first and second support arms, wherein each of the bicycle mounts comprises:
a trough for receiving a crossbar of a bicycle, the trough including raised first and second sides for restricting side to side movement of the crossbar;
a first strap, a first end of the first strap attached to the first side of the trough, and a second end of the first strap attached to the second side of the trough, the first strap securing the crossbar in the trough;
a collared opening disposed adjacent to the trough section for receiving either the first or second support arm, the collared opening extending generally perpendicular to the trough section, at least a portion of the collared opening having a ribbed configuration in perspective, the ribbed configuration formed by a plurality of raised elongated ribs spaced apart from one another and longitudinally extending through the collared opening;
raised support ribs extending along an exterior surface of the bicycle mount in a direction generally perpendicular to the collared opening, the support ribs disposed along opposing sides of the collared opening and extending to opposite ends of the trough, the raised support ribs increasing in height as they extend toward the ends of the trough;
an elongated member disposed adjacent to the collared opening, opposite the trough;
a channel disposed adjacent to the elongated member, opposite the collared opening for receiving a tube member of the bicycle, the channel including raised first and second sides for restricting side to side movement of the tube member; and
a second strap, a first end of the second strap attached to the first side of the channel, and a second end of the second strap attached to the second side of the channel, the second strap securing the tube member in the channel,
wherein the elongated member facilitates forward and back motion of the channel to accommodate receiving the tube member of the bicycle while restricting side to side movement of the channel.

2. An anti-sway bicycle mount comprising:
a trough for receiving a crossbar of a bicycle, the trough including raised first and second sides for restricting side to side movement of the crossbar;
a first strap, a first end of the first strap attached to the first side of the trough, and a second end of the first strap attached to the second side of the trough, the first strap securing the crossbar in the trough;
a collared opening disposed adjacent to the trough section for receiving a support arm of a bicycle carrier, the collared opening extending generally perpendicular to the trough section, at least a portion of the collared opening having a ribbed configuration in perspective, the ribbed configuration formed by a plurality of raised elongated ribs spaced apart from one another and longitudinally extending through the collared opening;
raised support ribs extending along an exterior surface of the bicycle mount in a direction generally perpendicular to the collared opening, the support ribs disposed along opposing sides of the collared opening and extending to opposite ends of the trough, the raised support ribs increasing in height as they extend toward the ends of the trough;
an elongated member disposed adjacent to the collared opening, opposite the trough;
a channel disposed adjacent to the elongated member, opposite the collared opening, for receiving a tube member of the bicycle, the channel including raised first and second sides for restricting side to side movement of the tube member; and
a second strap, a first end of the second strap attached to the first side of the channel, and a second end of the second strap attached to the second side of the channel, the second strap securing the tube member in the channel, wherein the elongated member facilitates forward and back motion of the channel to accommodate receiving the tube member of the bicycle while restricting side to side movement of the channel.

3. The anti-sway bicycle mount of claim 2 wherein each of the first and second straps includes a plurality of openings disposed along the lengths thereof.

4. The anti-sway bicycle mount of claim 2 wherein the channel receives a rear tube of the bicycle while the trough receives the crossbar.

5. The anti-sway bicycle mount of claim 2 wherein the channel receives a transverse tube of the bicycle while the trough receives the crossbar.

6. An anti-sway bicycle mount comprising:
a trough section adapted for receiving a crossbar of a bicycle;
a collar section adapted for receiving a support arm of a bicycle carrier, the collar section disposed adjacent to the trough section, the collar section having an central opening through which the support arm traverses, the central opening extending generally perpendicular to the trough section, at least a portion of the central opening having a ribbed configuration in perspective, the ribbed configuration formed by a plurality of raised elongated ribs spaced apart from one another and longitudinally extending through the central opening, the collar section having an exterior surface with at least one raised support rib, the at least one raised support rib extending along the exterior surface of the collar section in a direction generally perpendicular to the central opening, the at least one raised support rib extending from the exterior surface of the collar section to an end of the trough section, the at least one raised support rib increasing in height as it extends toward the end of the trough section;
a neck section disposed adjacent to the collar section, opposite the trough section; and
a channel section adapted for receiving a tube member of the bicycle, the channel section disposed adjacent to the neck section, opposite the collar section, wherein the neck section facilitates forward and back motion of the channel section while restricting side to side movement of the channel section.

7. The anti-sway bicycle mount of claim 6 wherein the opening is one of circular, ovular, square, or rectangular.

8. The anti-sway bicycle mount of claim 6 whereby the exterior surface of the collar section has opposing sides each having at least one raised support rib.

9. The anti-sway bicycle mount of claim 6 further comprising a plurality of connection points disposed on an exterior surface of the trough section.

10. The anti-sway bicycle mount of claim 9 further comprising at least one strap, wherein a first end of the strap attaches to a first connection point, and a second end of the strap attaches to a second connection point, and wherein the strap secures the crossbar in the trough section.

11. The anti-sway bicycle mount of claim 6 wherein the neck section extends generally perpendicular to the trough section.

12. The anti-sway bicycle mount of claim 11 wherein the neck section is flexible in a first direction and rigid in a second direction.

13. The anti-sway bicycle mount of claim 6 further comprising first and second connection points disposed on an exterior surface of the channel section.

14. The anti-sway bicycle mount of claim 13 further comprising at least one strap, wherein a first end of the strap attaches to a first connection point, and a second end of the strap attaches to a second connection point, and wherein the strap secures the tube member in the channel section.

15. The anti-sway bicycle mount of claim 6 wherein the trough section extends in a lateral direction, the trough including open first and second ends and raised first and second sides.

16. The anti-sway bicycle mount of claim 15 wherein the raised first and second sides restrict movement of the crossbar.

17. The anti-sway bicycle mount of claim 15 further comprising ribbing disposed within the trough section.

18. The anti-sway bicycle mount of claim 6 wherein the channel section contiguously extends from the neck section, the channel section including a closed end, an open end opposite the closed end, and raised first and second sides.

19. The anti-sway bicycle mount of claim 18 further comprising an angled transition disposed proximate to the closed end of the channel section.

20. The anti-sway bicycle mount of claim 18 wherein the first and second raised sides restrict movement of the tube member.

21. The anti-sway bicycle mount of claim 18 further comprising ribbing disposed on at least a back side of the channel section.

22. The anti-sway bicycle mount of claim 6 formed from one integral piece of material.

23. The anti-sway bicycle mount of claim 22 wherein the material includes thermoplastic rubber.

24. The anti-sway bicycle mount of claim 22 wherein a second material is disposed over at least portions of the trough section and the channel section.

25. The anti-sway bicycle mount of claim 24 wherein the second material includes a polyurethane foam.

* * * * *